United States Patent
Mizuno et al.

(10) Patent No.: US 9,670,099 B2
(45) Date of Patent: *Jun. 6, 2017

(54) THERMAL SPRAY POWDER AND FILM THAT CONTAIN RARE-EARTH ELEMENT, AND MEMBER PROVIDED WITH FILM

(71) Applicants: FUJIMI INCORPORATED, Kiyosu-shi, Aichi (JP); TOKYO ELECTRON LIMITED, Minato-ku, Tokyo (JP)

(72) Inventors: Hiroaki Mizuno, Kiyosu (JP); Junya Kitamura, Kiyosu (JP); Yoshiyuki Kobayashi, Miyagi-ken (JP)

(73) Assignees: FUJIMI INCORPORATED, Kiyosu-Shi (JP); TOKYO ELECTRON LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/346,553

(22) PCT Filed: Sep. 26, 2012

(86) PCT No.: PCT/JP2012/074719
§ 371 (c)(1),
(2) Date: Mar. 21, 2014

(87) PCT Pub. No.: WO2013/047589
PCT Pub. Date: Apr. 4, 2013

(65) Prior Publication Data
US 2014/0234653 A1  Aug. 21, 2014

(30) Foreign Application Priority Data

Sep. 26, 2011 (JP) ................. 2011-209563

(51) Int. Cl.
    C23C 4/10     (2016.01)
    C04B 35/495   (2006.01)
    C04B 35/49    (2006.01)
    C04B 35/505   (2006.01)
    C04B 35/50    (2006.01)
    C23C 4/11     (2016.01)

(52) U.S. Cl.
    CPC ............ *C04B 35/49* (2013.01); *C04B 35/495* (2013.01); *C04B 35/50* (2013.01); *C04B 35/505* (2013.01); *C23C 4/10* (2013.01); *C23C 4/11* (2016.01); *C04B 2235/3206* (2013.01); *C04B 2235/3208* (2013.01); *C04B 2235/3213* (2013.01); *C04B 2235/3217* (2013.01); *C04B 2235/3225* (2013.01); *C04B 2235/3227* (2013.01); *C04B 2235/3232* (2013.01); *C04B 2235/3244* (2013.01); *C04B 2235/3251* (2013.01); *C04B 2235/3258* (2013.01); *C04B 2235/3284* (2013.01); *C04B 2235/34* (2013.01); *C04B 2235/3409* (2013.01); *C04B 2235/3418* (2013.01); *Y10T 428/1266* (2015.01); *Y10T 428/12611* (2015.01); *Y10T 428/12618* (2015.01); *Y10T 428/12729* (2015.01); *Y10T 428/12931* (2015.01); *Y10T 428/12937* (2015.01); *Y10T 428/12944* (2015.01); *Y10T 428/12951* (2015.01)

(58) Field of Classification Search
    CPC ........... C23C 4/128; C23C 4/127; C23C 4/04; C23C 4/10; C23C 4/105; C23C 4/11; Y10T 428/12929; Y10T 428/12611; Y10T 428/12618; Y10T 428/1266; Y10T 428/12931; Y10T 428/12937; Y10T 428/12944; Y10T 428/12951; Y10T 428/12729; C22C 29/00
    USPC ....... 428/630, 631, 632, 633, 639, 649, 655, 428/660, 450
    See application file for complete search history.

(56) References Cited

U.S. PATENT DOCUMENTS

| | | | |
|---|---|---|---|
| 4,542,111 A * | 9/1985 | Buran et al. ................... | 501/127 |
| 4,751,099 A * | 6/1988 | Niino et al. ................... | 427/450 |
| 6,194,083 B1 * | 2/2001 | Yasuda et al. ................ | 428/615 |
| 6,429,400 B1 | 8/2002 | Sawada et al. | |

(Continued)

FOREIGN PATENT DOCUMENTS

| | | |
|---|---|---|
| JP | 11-251304 A | 9/1999 |
| JP | 11-264084 * | 9/1999 |

(Continued)

OTHER PUBLICATIONS

Machine Translation, Yasuda, et al., JP 11-264084, Sep. 1999.*
US Final Office Action dated Jan. 12, 2016 issued in U.S. Appl. No. 14/346,583.
U.S. Appl. No. 14/346,583, filed Mar. 21, 2014, Fujimi Incorporated.

(Continued)

*Primary Examiner* — Michael E La Villa
(74) *Attorney, Agent, or Firm* — Foley & Lardner LLP

(57) ABSTRACT

A thermal spray powder of the present invention contains a rare earth element and a group 2 element, which belongs to group 2 of the periodic table. The thermal spray powder, which contains a rare earth element and a group 2 element, is formed, for example, from a mixture of a rare earth element compound and a group 2 element compound or from a compound or solid solution containing a rare earth element and a group 2 element. The thermal spray powder may further contain a diluent element that is not a rare earth element or a group 2 element and is not oxygen, which is at least one element selected, for example, from titanium, zirconium, hafnium, vanadium, niobium, tantalum, zinc, boron, aluminum, gallium, silicon, molybdenum, tungsten, manganese, germanium, and phosphorus.

10 Claims, No Drawings

(56) References Cited

U.S. PATENT DOCUMENTS

| | | | |
|---|---|---|---|
| 6,602,814 B1* | 8/2003 | Gadow | C01G 25/02 252/62 |
| 9,528,176 B2* | 12/2016 | Mizuno | C23C 4/04 |
| 2002/0160189 A1* | 10/2002 | Wataya et al. | 428/402 |
| 2004/0033884 A1* | 2/2004 | Wallar | 501/103 |
| 2007/0049484 A1* | 3/2007 | Kear et al. | 501/103 |
| 2007/0068798 A1 | 3/2007 | Honda et al. | |
| 2008/0213496 A1 | 9/2008 | Sun et al. | |
| 2010/0136349 A1 | 6/2010 | Lee | |
| 2010/0272982 A1 | 10/2010 | Dickinson et al. | |

FOREIGN PATENT DOCUMENTS

| | | |
|---|---|---|
| JP | 11-264084 A | 9/1999 |
| JP | 2008-133528 A | 6/2008 |
| JP | 2010-535288 A | 11/2010 |
| WO | WO 2010/053687 A2 | 5/2010 |

OTHER PUBLICATIONS

US Non-Final Office Action dated Aug. 18, 2015 issued in U.S. Appl. No. 14/346,583.

Mizuno: US Notice of Allowance dated Jul. 21, 2016 issued in U.S. Appl. No. 14/346,583.

* cited by examiner

THERMAL SPRAY POWDER AND FILM THAT CONTAIN RARE-EARTH ELEMENT, AND MEMBER PROVIDED WITH FILM

TECHNICAL FIELD

The present invention relates to a thermal spray powder containing a rare earth element. The present invention also relates to a coating containing a rare earth element and a member including the coating.

BACKGROUND ART

In the field of semiconductor device manufacturing, microfabrication of a semiconductor substrate, such as a silicon wafer, is performed at times by plasma etching, which is one type of dry etching. During this etching process, a member inside a semiconductor device manufacturing apparatus that is exposed to reactive plasma may be subject to erosion (damage) and generate particles. Deposition of the generated particles on the semiconductor substrate may make it difficult to perform microfabrication as designed or cause contamination of the semiconductor substrate by elements contained in the particles. A thermal spray coating containing a rare earth element is therefore conventionally provided on a member exposed to reactive plasma during the etching process to protect the member from plasma erosion (see, for example, Patent Document 1).

However, even with a thermal spray coating containing a rare earth element, the generation of particles cannot be suppressed completely. In order to minimize the detrimental effects due to particles as much as possible, it is important first of all to reduce the number of particles deposited on the semiconductor substrate, and for this purpose, it is effective to reduce the size of particles generated when a thermal spray coating is subject to plasma erosion. This is because particles of small size are readily subject to erosion by the reactive plasma while being suspended in the etching process and eventually made to disappear by being gasified or are readily discharged to the exterior by being carried by a gas flow inside the semiconductor device manufacturing apparatus and are thereby prevented from depositing on the semiconductor substrate.

In addition to reducing the size of the particles generated, reduction of the contamination of the semiconductor substrate that is mainly caused by the element contained in the particles is also desired (see, for example, Patent Document 2). The degree of contamination can be evaluated by recovering and chemically analyzing a washing liquid that was used to wash the semiconductor substrate after the etching process. In the case where a member provided with a thermal spray coating containing a rare earth element as a main component is used in a semiconductor device manufacturing apparatus, particles generated from the thermal spray coating contains a large amount of the rare earth element. This may cause the rare earth element content in particles deposited on the semiconductor substrate to exceed an allowable level, which is called falling out of specifications.

PRIOR ART DOCUMENTS

Patent Document 1: Japanese Laid-Open Patent Publication No. 2008-133528
Patent Document 2: Japanese Laid-Open Patent Publication No. 2010-535288

SUMMARY OF THE INVENTION

Problems that the Invention is to Solve

Therefore, it is an objective of the present invention to provide a thermal spray powder suited for forming a thermal spray coating that is less likely to generate particles of large size when subject to plasma erosion. Also, another objective of the present invention is to provide a coating that is less likely to generate particles of large size when subject to plasma erosion and a member that includes the coating on its surface.

Means for Solving the Problems

In order to achieve the above objectives and in accordance with a first aspect of the present invention, a thermal spray powder is provided that contains a rare earth element and a group 2 element, which belongs to group 2 of the periodic table. The rare earth element and the group 2 element are contained in the thermal spray powder, for example, in the form of oxides. The thermal spray powder may further contain, for example in the form of an oxide, a diluent element that is not a rare earth element or a group 2 element and is not oxygen. The diluent element may, for example, be at least one element selected from the group consisting of titanium, zirconium, hafnium, vanadium, niobium, tantalum, zinc, boron, aluminum, gallium, silicon, molybdenum, tungsten, manganese, germanium, and phosphorus. Alternatively, the diluent element may be a combination of zirconium and at least one element that is not a rare earth element or a group 2 element and is not oxygen or zirconium.

In accordance with a second aspect of the present invention, a coating obtained by thermal spraying the thermal spray powder according to the first aspect is provided.

In accordance with a third aspect of the present invention, a coating containing a rare earth element and a group 2 element, which belongs to group 2 of the periodic table, is provided.

In accordance with a fourth aspect of the present invention, a member including the coating according to the second or third aspect on its surface is provided.

Effects of the Invention

The present invention succeeds in providing a thermal spray powder suited for forming a thermal spray coating that is less likely to generate particles of large size when subject to plasma erosion. Also, the present invention succeeds in providing a coating that is less likely to generate particles of large size when subject to plasma erosion and a member that includes the coating on its surface.

MODES FOR CARRYING OUT THE INVENTION

One embodiment of the present invention will now be described. The present invention is not restricted to the embodiment described below and modifications may be made as suited within a range that does not impair the effects of the present invention.

A thermal spray powder according to the embodiment contains a rare earth element and a group 2 element, which is an element belonging to group 2 of the periodic table.

Rare earth elements are, specifically, scandium (element symbol: Sc), yttrium (element symbol: Y), lanthanum (element symbol: La), cerium (element symbol: Ce), praseodymium (element symbol: Pr), neodymium (element symbol: Nd), promethium (element symbol: Pm), samarium (element symbol: Sm), europium (element symbol: Eu), gadolinium (element symbol: Gd), terbium (element symbol: Tb), dysprosium (element symbol: Dy), holmium (element symbol: Ho), erbium (element symbol: Er), thulium (element symbol: Tm), ytterbium (element symbol: Yb), and lutetium (element symbol: Lu). Among these, Sc, Y, La, Ce, Pr, Nd, Sm, Gd, Dy, Er, and Yb, and especially Sc, Y, La, Ce, and Nd, which are present relatively abundantly in the earth's crust, are favorable.

Group 2 elements are, specifically, beryllium (element symbol: Be), magnesium (element symbol: Mg), calcium (element symbol: Ca), strontium (element symbol: Sr), barium (element symbol: Ba), and radium (element symbol: Ra). Among these, Mg, Ca, Sr, and Ba, and especially Mg, Ca, and Sr, which are present relatively abundantly in the earth's crust, are favorable.

The content of a rare earth element in the thermal spray powder is preferably 20% by mol or more, more preferably 25% by mol or more, even more preferably 30% by mol or more, and especially preferably 35% by mol or more in terms of oxide. Rare earth element compounds, such as rare earth element oxides, are high in chemical stability and excellent in plasma erosion resistance. Therefore, as the rare earth element content in the thermal spray powder increases, the plasma erosion resistance of a coating obtained by thermal spraying the thermal spray powder tends to improve.

The content of a rare earth element in the thermal spray powder is also preferably 90% by mol or less, more preferably 80% by mol or less, even more preferably 70% by mol or less, and especially preferably 60% by mol or less in terms of oxide. Rare earth elements are expensive and unstable in supply due to the uneven distribution of production sites. Accordingly, as the rare earth element content in the thermal spray powder decreases, there is an advantage of reduction in risk related to the supply of raw material of the thermal spray powder.

The content of a group 2 element in the thermal spray powder is preferably 3% by mol or more, more preferably 3.5% by mol or more, even more preferably 4% by mol or more, and especially preferably 4.5% by mol or more in terms of oxide. As the group 2 element content in the thermal spray powder increases, the size of particles is reduced that are generated when a coating obtained by thermal spraying the thermal spray powder is subject to plasma erosion. The reason for this is considered to be that since group 2 element compounds are lower in plasma erosion resistance than rare earth element compounds, weak points that are readily attacked by plasma are present in a dispersed manner in the coating due to the addition of the group 2 element thereto. On the other hand, if such weak points are not dispersed in the coating, attack by plasma is concentrated at the few weak points in the coating and consequently, particles of large size may be generated.

The content of a group 2 element in the thermal spray powder is also preferably 20% by mol or less, more preferably 15% by mol or less, even more preferably 12% by mol or less, and especially preferably 10% by mol or less in terms of oxide. As mentioned above, group 2 element compounds are relatively low in plasma erosion resistance. Therefore, as the group 2 element content in the thermal spray powder decreases, the plasma erosion resistance of a coating obtained by thermal spraying the thermal spray powder tends to improve.

The thermal spray powder may further contain a diluent element that is not a rare earth element or a group 2 element and is not oxygen, which is added to the thermal spray powder for the purpose of decreasing the ratios of the rare earth element content and the group 2 element content in the thermal spray powder and in a coating obtained by thermal spraying the thermal spray powder. Examples of the diluent element include titanium (element symbol: Ti), zirconium (element symbol: Zr), hafnium (element symbol: Hf), vanadium (element symbol: V), niobium (element symbol: Nb), tantalum (element symbol: Ta), zinc (element symbol: Zn), boron (element symbol: B), aluminum (element symbol: Al), gallium (element symbol: Ga), silicon (element symbol: Si), molybdenum (element symbol: Mo), tungsten (element symbol: W), manganese (element symbol: Mn), germanium (element symbol: Ge), and phosphorus (element symbol: P). The diluent element is not restricted in particular as long as it is not a rare earth element or a group 2 element and is not oxygen. However, when zirconium is used as the diluent element, there is an advantage of improvement of the plasma erosion resistance of a coating obtained by thermal spraying the thermal spray powder in comparison to the case of using another element as the diluent element.

The content of the diluent element in the thermal spray powder is preferably 10% by mol or more, more preferably 20% by mol or more, even more preferably 30% by mol or more, and especially preferably 40% by mol or more in terms of oxide. As the diluent element content in the thermal spray powder increases, the risk related to the supply of raw material of the thermal spray powder and the raw material cost of the thermal spray powder are reduced since the amount of a rare earth element used is reduced. Further, since the amounts of a rare earth element and a group 2 element contained in particles generated when a thermal spray coating obtained by thermal spraying the thermal spray powder is subject to plasma erosion are relatively lessened, the possibility of occurrence of contamination of a silicon wafer or other semiconductor substrates by the rare earth element and the group 2 element in the particles is reduced.

The content of the diluent element in the thermal spray powder is also preferably 60% by mol or less, more preferably 57% by mol or less, even more preferably 55% by mol or less, and especially preferably 48% by mol or less in terms of oxide. The plasma erosion resistance of a compound of the diluent element is generally lower than the plasma erosion resistance of a rare earth element compound. Therefore, as the diluent element content in the thermal spray powder decreases, the plasma erosion resistance of a coating obtained by thermal spraying the thermal spray powder tends to improve.

The thermal spray powder is formed, for example, from a mixture of a rare earth element compound and a group 2 element compound or from a compound or a solid solution containing a rare earth element and a group 2 element. A typical example of a rare earth element compound is a rare earth element oxide. A typical example of a group 2 element compound is a group 2 element oxide. A typical example of a compound or a solid solution containing a rare earth element and a group 2 element is a composite oxide of a rare earth element and a group 2 element. In the case where the thermal spray powder contains the diluent element, the thermal spray powder is formed, for example, from a mixture of a rare earth element compound, a group 2 element compound, and a compound of the diluent element or from a compound or a solid solution containing a rare earth element, a group 2 element, and the diluent element.

The thermal spray powder is produced, for example, by mixing a powder made of a group 2 element compound, such as a group 2 element oxide, in a powder made of a rare earth element compound, such as a rare earth element oxide, and if necessary, further mixing in a powder made of a compound (for example, an oxide) of the diluent element. Preferably, with a rare earth element compound powder used, particles having a particle diameter, as measured by a particle size distribution analyzer of a laser scattering and diffraction type, of 10 μm or less, and more specifically 6 μm or less, 3 μm or less, or 1 μm or less take up 90% by volume or more of the powder. By using a rare earth element compound powder of fine particle size, the size of particles can be reduced that are generated when a coating obtained by thermal spraying the thermal spray powder is subject to plasma erosion. The reason for this is considered to be that the rare earth element compound portions in the coating, which has the rare earth element compound portions and the group 2 element compound portions, are reduced in size.

Alternatively, the thermal spray powder may be produced by granulating and sintering a raw material powder containing a powder of a compound or simple substance of a rare earth element and a powder of a compound or simple substance of a group 2 element, and further containing, if necessary, a powder of a compound or simple substance of the diluent element. In this case, even if the rare earth element, the group 2 element, and the diluent element are present in the raw material powder in forms other than their respective oxides, for example, in the form of their respective simple substances, hydroxides, or salts, it is possible to convert these to oxides in the sintering process.

In producing the thermal spray powder constituted of granulated and sintered particles obtained by granulation and sintering of the raw material powder, the granulation of the raw material powder may be performed by spray granulation of a slurry prepared by mixing the raw material powder in a suitable dispersion medium and adding a binder to the mixture as necessary or may be performed directly from the raw material powder by rolling granulation or compression granulation. The sintering of the raw material powder after granulation may be performed in air, in an oxygen atmosphere, in a vacuum, or in an inert gas atmosphere. However, to convert an element in the raw material powder that is present in forms other than an oxide to an oxide, it is preferable to perform the sintering in air or in an oxygen atmosphere. The sintering temperature is not restricted in particular and is preferably 1,000 to 1,700° C., more preferably 1,100 to 1,700° C., and even more preferably 1,200 to 1,700° C. The maximum temperature retention time during sintering is also not restricted in particular and is preferably 10 minutes to 24 hours, more preferably 30 minutes to 24 hours, and even more preferably 1 to 24 hours.

The thermal spray powder according to the embodiment is used for forming a coating on the surface of a member in a semiconductor device manufacturing apparatus or another member by a thermal spraying method, such as a plasma spraying method, a high-velocity flame spraying method, flame spraying method, detonation flame spraying method, and aerosol deposition method. In a coating obtained by thermal spraying the thermal spray powder, at least a rare earth element and a group 2 element are contained in the form of compounds, such as oxides.

The size of the rare earth element compound portions in the thermal spray coating as observed from a reflection electron image obtained by a field emission scanning electron microscope is preferably 20 μm$^2$ or less, more preferably 2 μm$^2$ or less, even more preferably 0.2 μm$^2$ or less, and especially preferably 0.02 μm$^2$ or less. As the rare earth element compound portions are reduced in size, the size of particles can be reduced that are generated from the thermal spray coating when it is subject to plasma erosion.

The thickness of the thermal spray coating is not restricted in particular and may, for example, be 30 to 1,000 μm. However, the thickness is preferably 50 to 500 μm and more preferably 80 to 300 μm.

The following effects and advantages are provided by the present embodiment.

The thermal spray powder according to the present embodiment contains a rare earth element and a group 2 element. The coating, containing the rare earth element and the group 2 element, that is obtained by thermal spraying the thermal spray powder thus has a high plasma erosion resistance as an effect of the rare earth element and has a property of being less likely to generate particles of large size as an effect of the group 2 element. That is, the present embodiment succeeds in providing a thermal spray powder suited for forming a thermal spray coating that is less likely to generate particles of large size when subject to plasma erosion. Also, the present invention succeeds in providing a coating that is less likely to generate particles of large size when subject to plasma erosion and a member that includes the coating on its surface.

The thermal spray powder according to the present embodiment contains a group 2 element in addition to a rare earth element and, in some cases, further contains a diluent element that is not a rare earth element or a group 2 element and is not oxygen. The amount of a rare earth element used, which is expensive and unstable in supply, can thus be suppressed and the risk related to the supply of raw material of the thermal spray powder can be reduced. Also, the amount of a rare earth element contained in particles is relatively lessened that are generated when a thermal spray coating obtained by thermal spraying the thermal spray powder is subject to plasma erosion, the possibility of occurrence of contamination of a silicon wafer or other semiconductor substrates by the rare earth element in the particles is reduced.

The embodiment may be modified as follows.

The thermal spray powder according to the embodiment may contain two or more types or preferably three or more types of rare earth elements. That is, the thermal spray powder may contain two or more or preferably three or more elements selected from the group consisting of Sc, Y, La, Ce, Pr, Nd, Pm, Sm, Eu, Gd, Tb, Dy, Ho, Er, Tm, Yb, and Lu. In this case, when a thermal spray coating obtained by thermal spraying the thermal spray powder is subject to plasma erosion and generates particles, the rare earth element content in the particles is divided by type of the rare earth elements, thereby enabling reduction of the possibility of the content of each rare earth element in particles deposited on the semiconductor substrate to exceed an allowable level. The content of each rare earth element in the thermal spray powder is preferably 3% by mol or more, more preferably 5% by mol or more, and even more preferably 10% by mol or more in terms of oxide. The content of each rare earth element in the thermal spray powder is also preferably 50% by mol or less, more preferably 40% by mol or less, even more preferably 30% by mol or less, and especially preferably 25% by mol or less in terms of oxide.

The thermal spray powder according to the embodiment may contain two or more types or preferably three or more types of group 2 elements. That is, the thermal spray powder may contain two or more or preferably three or more elements selected from the group consisting of Be, Mg, Ca, Sr, Ba, and Ra. In this case, when a thermal spray coating obtained by thermal spraying the thermal spray powder is subject to plasma erosion and generates particles, the group 2 element content in the particles is divided by type of the group 2 elements, thereby enabling reduction of the possibility of the content of each group 2 element in particles deposited on the semiconductor substrate to exceed an allowable level. The content of each group 2 element in the thermal spray powder is preferably 1% by mol or more, more preferably 1.5% by mol or more, even more preferably 2% by mol or more, and especially preferably 2.5% by mol or more in terms of oxide. The content of each group 2 element in the thermal spray powder is also preferably 15% by mol or less, more preferably 12% by mol or less, even more preferably 10% by mol or less, and especially preferably 8% by mol or less in terms of oxide.

The thermal spray powder according to the embodiment may contain two or more types or preferably three or more types of diluent elements. For example, the thermal spray powder may contain two or more or preferably three or more elements selected from the group consisting of Ti, Zr, Hf, V, Nb, Ta, Zn, B, Al, Ga, Si, Mo, W, Mn, Ge, and P. In this case, when a thermal spray coating obtained by thermal spraying the thermal spray powder is subject to plasma erosion and generates particles, the diluent element content in the particles is divided by type of the diluent elements, thereby enabling reduction of the possibility of the content of each diluent element in particles deposited on the semiconductor substrate to exceed an allowable level. The content of each diluent element in the thermal spray powder is preferably 5% by mol or more, more preferably 10% by mol or more, even more preferably 15% by mol or more, and especially preferably 20% by mol or more in terms of oxide. The content of each diluent element in the thermal spray powder is also preferably 40% by mol or less, more preferably 30% by mol or less, even more preferably 20% by mol or less, and especially preferably 15% by mol or less in terms of oxide. Among the above elements, the use of Zr (zirconium) in combination with another diluent element is preferable because the plasma erosion resistance of a coating obtained by thermal spraying the thermal spray powder is improved by the addition of zirconium.

The coating containing a rare earth element and a group 2 element is not restricted to being formed by thermal spraying a thermal spray powder such as that of the embodiment and may be formed by a method other than thermal spraying, for example, a chemical vapor deposition (CVD) method or a physical vapor deposition (PVD) method. The thickness of a coating that contains a rare earth element and a group 2 element and is formed by a method other than thermal spraying may, for example, be 0.1 to 100 μm and is preferably 0.5 to 50 μm and more preferably 1 to 30 μm.

Next, the present invention will be described more specifically by way of examples and comparative examples.

Thermal spray powders of Examples 1 to 5 and Comparative Examples 1 and 2, each containing a rare earth element, and a thermal spray powder of Comparative Example 3, not containing a rare earth element, were prepared. Each of the thermal spray powders of Examples 1 to 5 was produced by mixing and then granulating and sintering at least a powder of a rare earth element oxide, a powder of group 2 element oxide, and a powder of an oxide of a diluent element that is not a rare earth element or a group 2 element and is not oxygen. The thermal spray powder of Comparative Example 1 was produced by granulating and sintering a powder of a rare earth element oxide. The thermal spray powder of Comparative Example 2 was produced by mixing and then granulating and sintering a powder of a rare earth element oxide and powders of oxides of diluent elements that are not rare earth elements or group 2 elements and are not oxygen. The thermal spray powder of Comparative Example 3 was produced by mixing and then granulating and sintering a powder of a group 2 element oxide and powders of oxide of diluent elements that are not rare earth elements or group 2 elements and are not oxygen. The details of the respective thermal spray powders are as shown in Table 1.

The types of rare earth elements contained in the respective thermal spray powders are shown in the "Type of rare earth element" column of Table 1. The molar percentages of rare earth element oxides in the respective thermal spray powders are shown in the "Ratio of rare earth element oxide" column of Table 1 according to each type of rare earth element.

The types of group 2 elements contained in the respective thermal spray powders are shown in the "Type of group 2 element" column of Table 1. The molar percentages of group 2 element oxides in the respective thermal spray powders are shown in the "Ratio of group 2 element oxide" column of Table 1 according to each type of group 2 element.

The types of diluent elements contained in the respective thermal spray powders are shown in the "Type of diluent element" column of Table 1. The molar percentages of diluent element oxides in the respective thermal spray powders are shown in the "Ratio of diluent element oxide" column of Table 1 according to each type of diluent element.

The sizes of the rare earth element compound portions in thermal spray coatings obtained by atmospheric pressure plasma spraying of the respective thermal spray powders under the thermal spraying conditions shown in Table 2 are shown in the "Size of rare earth element compound portions in coating" column of Table 1. The sizes were measured by observation of the thermal spray coatings by a reflection electron image obtained by a field emission scanning electron microscope.

The respective thermal spray powders of Examples 1 to 5 and Comparative Examples 1 to 3 were atmospheric pressure plasma sprayed under the thermal spraying conditions shown in Table 2 to form thermal spray coatings of 200 μm thickness on the surfaces of Al alloy (A6061) plates of 20 mm×20 mm×2 mm dimensions that had been blasted with a brown alumina abrasive (A#40). The results of evaluating the plasma erosion resistances of the thermal spray coatings obtained are shown in the "Plasma erosion resistance" column of Table 1. Specifically, the surface of each thermal spray coating was first mirror-polished using colloidal silica with an average particle diameter of 0.06 μm and a portion of the polished surface of the thermal spray coating was masked with a polyimide tape. Each thermal spray coating was then plasma etched under conditions of applying high frequency power of 1,300 W and 13.56 MHz for 20 hours while supplying an etching gas that is a 95:950:10 volume ratio mixture of carbon tetrafluoride ($CF_4$), argon, and oxygen at a flow rate of 1.055 L/minute (1,055 sccm) inside a chamber of a parallel plate plasma etching apparatus maintained at a pressure of 133.3 Pa (1,000 mTorr). Thereafter, the size of a step between the masked portion and the unmasked portion was measured using the step measuring apparatus, "Alphastep," available from KLA-Tencor Corporation and the measured step size was divided by the etching time to calculate the etching rate. In the "Plasma erosion resistance" column, "good" means that the ratio of the etching rate with respect to the etching rate in the case of Comparative Example 1 was less than 1.5 and "poor" means that the ratio was 1.5 or more.

The respective thermal spray powders of Examples 1 to 5 and Comparative Examples 1 to 3 were atmospheric pressure plasma sprayed under the thermal spraying conditions shown in Table 2 to form thermal spray coatings of 200 μm thickness on the surfaces of focus rings that are each used by installing on a periphery of a silicon wafer. The results of evaluating the number of particles that were generated due to plasma erosion from the thermal spray coating on each focus ring and deposited on each silicon wafer are shown in the "Number of particles" column of Table 1. Specifically, the surface of the thermal spray coating on each focus ring was polished using sandpaper until the surface roughness Ra became 0.5 μm or less. Each focus ring was then set, together with a silicon wafer, inside a chamber of a parallel plate plasma etching apparatus, and while maintaining the pressure inside the chamber at 133.3 Pa, an etching gas that is a 95:950:10 volume ratio mixture of carbon tetrafluoride, argon, and oxygen was supplied into the chamber at a flow rate of 1.055 L/minute, and under this state, each silicon wafer was plasma etched under the condition of applying high frequency power of 1,300 W and 13.56 MHz for 20 hours. Thereafter, the number of particles that were generated due to plasma erosion from the thermal spray coating on each focus ring and deposited on each silicon wafer was measured. The difference between the numbers of particles on each silicon wafer counted using the particle counter, "Surfscan," available from KLA-Tencor Corporation, before and after plasma etching was deemed to be the number of particles that were generated from the thermal spray coating on each focus ring and deposited on the silicon wafer, and in the "Number of particles" column, "good" means that the ratio of the number of particles with respect to the number of particles in the case of Comparative Example 1 was less than 1.0 and "poor" means that the ratio was 1.0 or more.

After thus evaluating the number of particles that were generated due to plasma erosion and deposited on each silicon wafer, the same silicon wafer was evaluated in terms of contamination. The results are shown in the "Contamination" column of Table 1. Specifically, quantitative analysis of a washing liquid that was used to wash each of the plasma-etched silicon wafers was performed using Agilent 7700, which is an ICP-MS apparatus available from Agilent Technologies Inc. In the "Contamination" column, "good" means that the ratio of the detected concentration of each element with respect to the detected concentration of yttrium (Y) in the case of Comparative Example 1 was less than 1.0 and "poor" means that the ratio was 1.0 or more.

The raw material supply risks, that is, the risks in acquisition of raw materials of the respective thermal spray powders are shown in the "Risk" column of Table 1. A "good" evaluation was made in the case where the percentage of rare earth element oxides contained in a thermal spray powder is 95% by mol or less and a "poor" evaluation was made when the percentage is greater than 95% by mol.

TABLE 1

| | Type of rare earth element | Ratio of rare earth element oxide [% by mol] | Type of group 2 element | Ratio of group 2 element oxide [% by mol] | Type of diluent element | Ratio of diluent element oxide [% by mol] | Size of rare earth element compound portions in coating [μm²] | Plasma erosion resistance | Number of particles | Contamination | Risk |
|---|---|---|---|---|---|---|---|---|---|---|---|
| Example 1 | Y | 25 | Sr | 7 | Zr | 12 | 0.01 | good | good | good | good |
| | Ce | 8 | | | Al | 14 | | | | | |
| | La | 4 | | | Ti | 9 | | | | | |
| | | | | | Zn | 9 | | | | | |
| | | | | | Si | 12 | | | | | |
| Example 2 | Yb | 10 | Ca | 3 | Al | 10 | 0.001 | good | good | good | good |
| | Ce | 10 | Mg | 5 | Nb | 10 | | | | | |
| | Sm | 10 | | | Ti | 5 | | | | | |
| | Er | 10 | | | Zn | 5 | | | | | |
| | La | 10 | | | W | 12 | | | | | |
| Example 3 | Sc | 5 | Ca | 3 | Zr | 15 | 0.001 | good | good | good | good |
| | Gd | 5 | Mg | 5 | Ta | 20 | | | | | |
| | Nd | 8 | Sr | 5 | Si | 10 | | | | | |
| | Pr | 9 | | | P | 8 | | | | | |
| | Ho | 2 | | | B | 5 | | | | | |
| Example 4 | Yb | 18 | Ca | 4 | Zr | 25 | 0.05 | good | good | good | good |
| | | | Mg | 5 | Al | 20 | | | | | |
| | | | Ba | 8 | Ti | 5 | | | | | |
| | | | | | Zn | 5 | | | | | |
| | | | | | Si | 10 | | | | | |
| Example 5 | Y | 90 | Ca | 2 | Zr | 8 | 24 | good | good | good | good |
| Comparative Example 1 | Y | 100 | — | — | — | — | — | good | poor | poor | poor |
| Comparative Example 2 | Y | 70 | — | — | Zr | 20 | 5 | good | poor | poor | good |
| | | | | | Nb | 10 | | | | | |
| Comparative Example 3 | — | — | Sr | 20 | Zr | 20 | — | poor | poor | poor | good |
| | | | | | Al | 40 | | | | | |
| | | | | | Nb | 20 | | | | | |

TABLE 2

Thermal spraying equipment: "SG-100," made by Praxair, Inc.
Powder supplying equipment: "Model 1264," made by Praxair, Inc.
Ar gas pressure: 50 psi (0.34 MPa)
He gas pressure: 50 psi (0.34 MPa)
Voltage: 37.0 V
Current: 900 A
Thermal spraying distance: 120 mm
Thermal spray powder supplying rate: 20 g/minute

The invention claimed is:

1. A coating obtained by thermal spraying a thermal spray powder comprising a rare earth element, a group 2 element, which belongs to group 2 of the periodic table, and an optional diluent element that is not any rare earth element or any group 2 element and is not oxygen, wherein
    each of the rare earth element, the group 2 element, and the optional diluent element is present in the form of an oxide in the thermal spray powder,
    the rare earth element is scandium, yttrium, cerium, praseodymium, promethium, gadolinium, terbium, dysprosium, holmium, erbium, thulium, ytterbium, or lutetium,
    the rare earth element oxide is contained in the thermal spray powder in an amount of 25% by mol or more of the mixture of the rare earth element oxide, the group 2 element oxide, and the optional diluent element oxide,
    the group 2 element oxide is contained in the thermal spray powder in an amount of 3% by mol or more of the mixture of the rare earth element oxide, the group 2 element oxide, and the optional diluent element oxide,
    the thermal spray powder is produced by granulating and then sintering a raw material powder containing a powder of a compound or simple substance of a rare earth element, a powder of a compound or simple substance of a group 2 element, and a powder of a compound or simple substance of the optional diluent element,
    the coating comprises rare earth element compound portions having a size of 20 $\mu m^2$ or less.

2. The coating according to claim 1, wherein the optional diluent element is at least one element selected from the group consisting of titanium, zirconium, hafnium, vanadium, niobium, tantalum, zinc, boron, aluminum, gallium, silicon, molybdenum, tungsten, manganese, germanium, and phosphorus.

3. The coating according to claim 2, wherein the optional diluent element oxide is contained in the thermal spray powder in an amount of 10% by mol or more and 60% by mol or less of the mixture of the rare earth element oxide, the group 2 element oxide, and the optional diluent element oxide.

4. A member comprising the coating according to claim 3 on its surface.

5. The coating according to claim 1, wherein the optional diluent element is a combination of zirconium and at least one element that is not any rare earth element or any group 2 element and is not oxygen or zirconium.

6. A member comprising the coating according to claim 1 on its surface.

7. The coating according to claim 1, wherein the size of the rare earth element compound portions is 0.2 $\mu m^2$ or less.

8. The coating according to claim 1, wherein the rare earth element oxide is contained in the thermal spray powder in an amount of 35% by mol or more and 60% by mol or less of the mixture of the rare earth element oxide, the group 2 element oxide, and the optional diluent element oxide.

9. The coating according to claim 1, wherein the group 2 element oxide is contained in the thermal spray powder in an amount of 4.5% by mol or more and 10% by mol or less of the mixture of the rare earth element oxide, the group 2 element oxide, and the optional diluent element oxide.

10. The coating according to claim 1, wherein the granulating is by spray granulation, rolling granulation or compression granulation.

* * * * *